United States Patent Office.

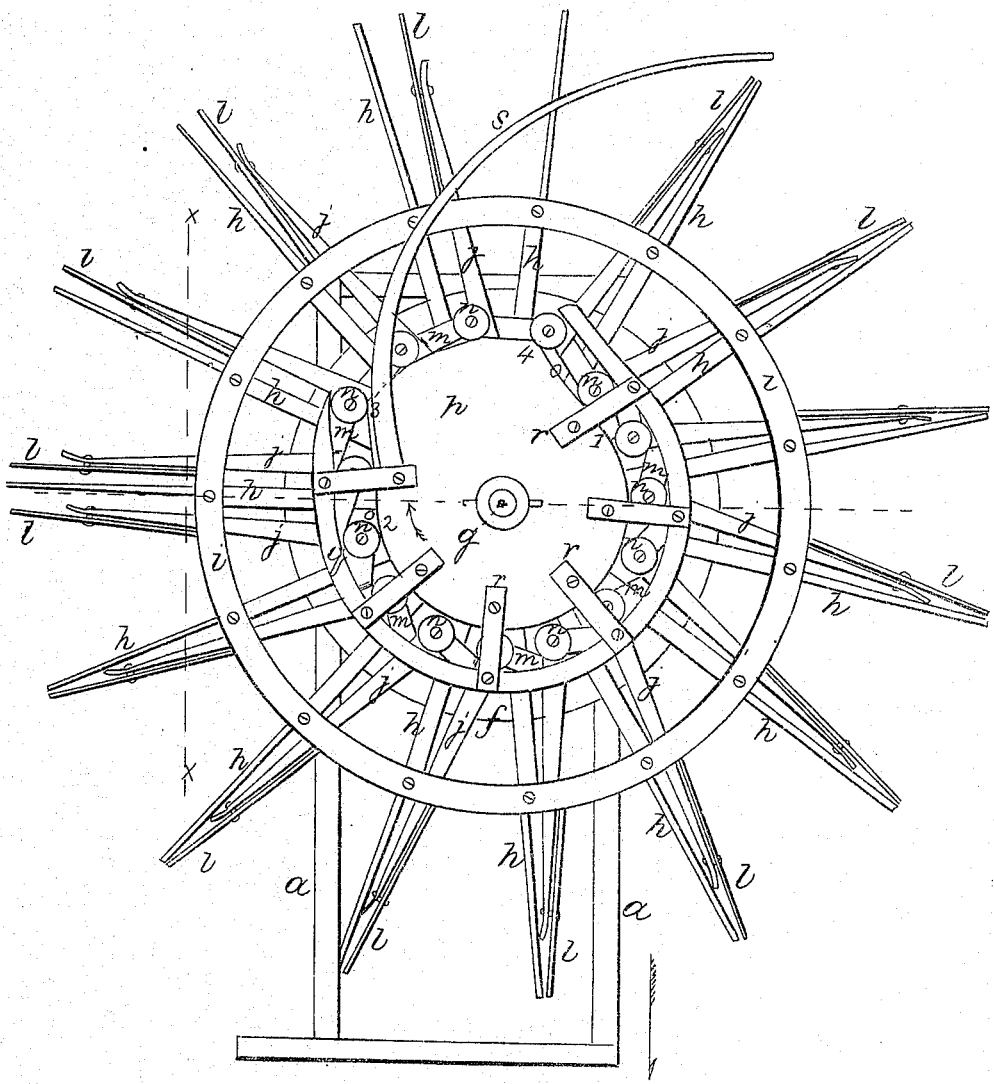

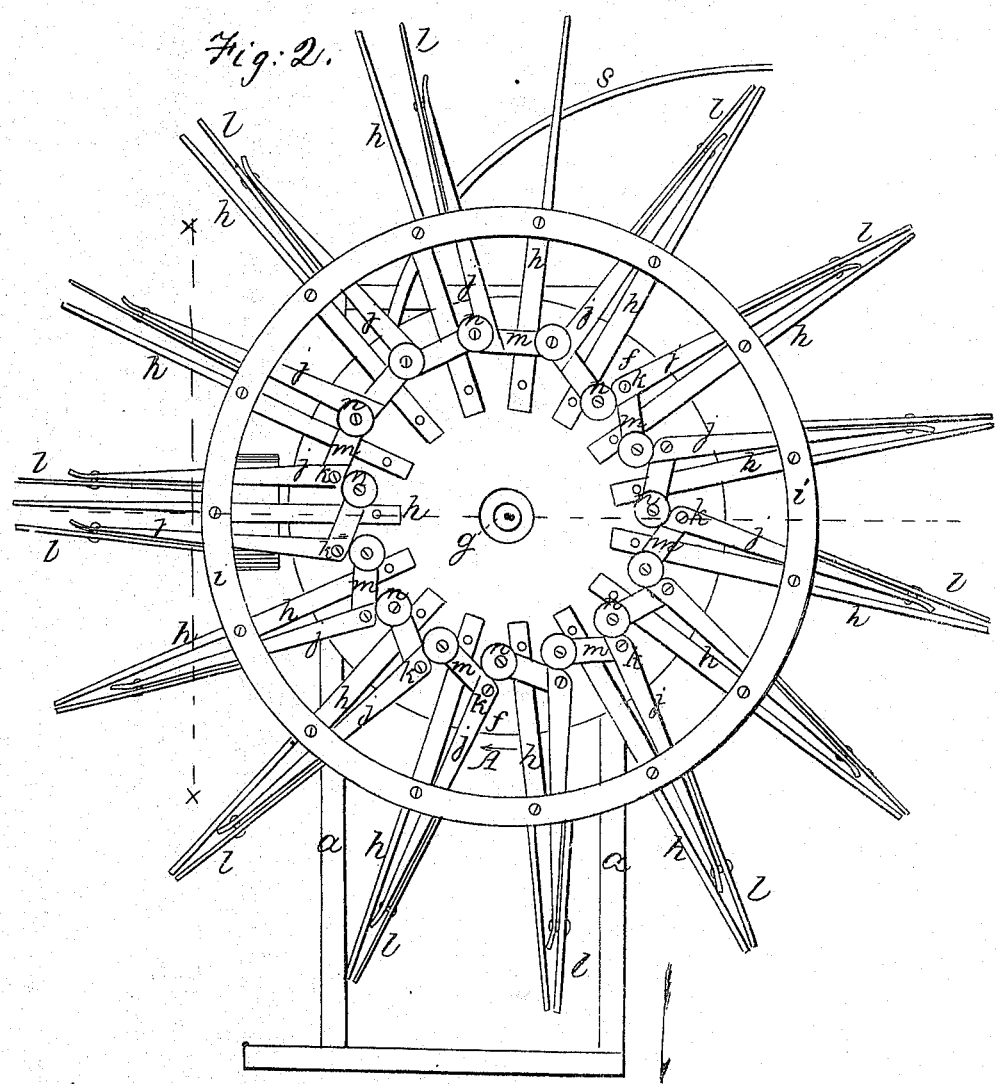

JAMES SMITH, OF TROY, NEW YORK.

Letters Patent No. 102,875, dated May 10, 1870.

---

IMPROVEMENT IN FLAX-PULLERS.

---

The Schedule referred to in these Letters Patent and making part of the same.

---

*To all whom it may concern:*

Be it known that I, JAMES SMITH, of Troy, Rensselaer county, State of New York, have invented a new and useful Machine for Pulling Flax; and I do hereby declare that the following is a full, clear, and exact description thereof, reference being had to the accompanying drawings making part of this specification, in which—

Figure 1 is a top view of the machine with the driver's seat removed;

Figure 2, a like view, with the cam for operating the griping-jaws removed; and

Figure 3, a cross vertical section, taken in the plane of the axis of the driving-wheel.

The same letters indicate like parts in all the figures.

The object of my said invention is to more effectually pull up flax by the roots and deliver it on the ground than by any other machine heretofore made for this purpose; and to this end my said invention consists of a series of pairs of griping-jaws, projecting from the periphery of a horizontal wheel or hub, which receives a rotary motion, by suitable gearing, from a driving-wheel or wheels that run on the ground, which griping-jaws are open at a part of their circuit to receive the standing flax as the machine advances, and which, as they travel around, are closed to gripe the flax and pull it out by the roots, and which are opened at another part of their circuit for the delivery thereof.

In the accompanying drawings—

$a$ represents a frame, which may be of any suitable construction for the machinery, to be hereinafter described, and to be provided with suitable means, as in the case of reaping and mowing-machines, by which it can be moved. This frame is to be mounted on wheels $b\ b'$, one or both of which should have their treads roughened or formed with projections, as is usual in wheels which are to impart motion to machinery. In the accompanying drawings only one of the said wheels is so represented.

On the inner face of the driving-wheel $b$ there is a cog-wheel, $c$, which communicates motion, by an intermediate pinion and wheel, $d\ e$, to a horizontal or nearly horizontal wheel, $f$, which turns on a stud, $g$, attached to the frame $a$.

To the upper surface of the said wheel $f$ are firmly secured a series of radial arms, $h$, placed at equal distances apart, and projecting to the required distance beyond the periphery of the wheel; and the said arms are further bound and held by two concentric rings $i\ i$, one above and the other below the arms, and embracing them, the two rings being secured to each other by bolts passing through them and through the arms, or in any other suitable manner. The said arms $h$ constitute each one jaw of the series of jaws before referred to, against which the flax to be pulled is griped.

There is another series of arms, $j$, equal in number to the jaws $h$, but which turn on fulcrum-pins $k$, on the wheel $f$, and to the outer ends of these arms are hinged what may be termed the movable jaws $l$ of the series of griping-jaws.

The arms $j$ vibrate in the space between the two rings $i\ i$, by which they are guided and supported, and the jaws $l$ are hinged about the middle of their length, the better to adapt themselves to any varying thickness of flax to be griped against the jaws $h$.

The arms $j$ are, in fact, levers, with shorter arms, $m$, extending nearly at right angles with the long arms $j$, and each of the short arms carries a friction-roller, $n$, fitted to run in a cam groove, $o$, formed between the outer periphery of a cam-plate, $p$, secured to the stud $g$, on which the wheel $f$ turns, and the inner periphery of a segment cam-ring, $q$, the two being connected by brace pieces $r$, or in any other suitable manner.

This cam, from about the point 1 to 2, is concentric, to hold the griping-jaws open. From the point 2 to 3, in the direction of the arrow, the cam increases gradually in radius to gradually close the jaws to gripe the flax, and from the point 3 to 4 it is concentric, or nearly so, to keep the jaws closed, to hold on to the flax while it is being pulled up or unrooted by the jaws as they travel toward the back of the machine, and then from the point 4 to 1, it gradually decreases in radius to open the jaws for the delivery of the flax which has been pulled up.

Where the pulled up flax is to be delivered, there are two curved guide-rods, $s\ s$, to insure the discharge of the flax from the jaws. One of them is attached to the frame, and extends below the series of jaws, and the other attached to the cam-plate, or any other permanent part of the machine, and extending above the series of jaws.

A suitable seat for a driver can be mounted on the cam-plate, but may be otherwise mounted. The faces of the griping-jaws may be covered with leather, vulcanized rubber, or other elastic substance, the better to gripe the stalks of hemp.

As the machine is drawn in the direction of the arrow, along the margin of a field of standing hemp, the edge of which is represented by the line $x\ x$, the hemp is collected in the open jaws, and, as the wheel $f$ rotates in the direction of the arrow A, the jaws are gradually closed, and thereby grasp the stalks, which, by the continued rotation, are pulled out by the roots, and then the jaws are gradually opened to liberate and drop them on the ground, sufficiently far from the line $x\ x$ to leave a clear space between them and the standing hemp for the next passage of the horses and machine. The delivery of the hemp from the griping-jaws is aided by the curved guide-rods s s.

It will be obvious, from the foregoing, that the griping-jaws may be opened and closed by other and equivalent means than the cam above described, such, for instance, as having the inner arms of the movable jaws connected with an eccentric, but the mode described and represented I deem the best. And, although I prefer to connect the movable jaws with their arms by yielding joints, that being best in my judgment, still that may be dispensed with, if the griping surface of the jaws be made sufficiently yielding to be self adapting to the inequalities of the hemp which may enter to be griped.

The gearing for rotating the wheel of griping-jaws may be connected with the driving-wheel by a ratchet and pawl, as practiced in reaping and mowing-machines, so that, in backing the machine, the jaws will not be moved. If desired, the jaws on the left-hand side of the machine may be covered by a suitable cap-plate.

And, although I prefer to have the griping-jaws connected with and carried by a wheel, such as described, and braced and sustained beyond the periphery of the wheel by the concentric rings, still, I do not wish to limit my claim of invention to such mode of construction, as other and equivalent modes may be substituted.

I am aware that a machine for pulling up flax by the roots has been described in a patent, the pulling operation being effected by a reel of jaws on a horizontal axis, and rotating in a vertical plane, and composed of bars or plates, parallel with the shaft, and on radial arms, with which are combined hinged jaws to gripe the flax against the bars on the radial arms. As the said reel rotates, one of the plates on the radial arms is intended to descend to pass down in front of that portion of the flax which is to be griped, and the corresponding hinged jaw, with a quick motion in the opposite direction, gripes the bunch of flax, and, as the reel continues to move backward, as the machine advances, the bunch of flax is to be pulled out by the roots and delivered on a platform behind, from which it is to be raked.

It is believed that this mode of operation is defective, if not impracticable, whilst, by my said invention, a series of griping-jaws, traveling in a horizontal or nearly horizontal direction, enter the standing flax, gripe the bunch, and pull it out by a lateral motion, and deliver it on the ground at the side of the track of the machine, leaving room for the next passage of the machine.

In view of the foregoing, I do not wish to be understood as claiming, broadly, a series of rotating jaws or clamps for griping, uprooting, and delivering flax; but What I do claim as my invention, and desire to secure by Letters Patent, is—

The arrangement of the series of griping-jaws on a wheel or hub, so that they shall rotate about a common center in a horizontal or nearly horizontal plane to enter between the standing flax, gripe it, pull it out by a motion in a horizontal or nearly horizontal direction, and deliver it on the ground at the side of the machine, out of the way of the next passage of the machine, substantially as described.

JAMES SMITH.

Witnesses:
CHARLES H. DAUCHY,
J. F. CALDERLY.